(12) United States Patent
Davydov et al.

(10) Patent No.: US 12,403,440 B2
(45) Date of Patent: Sep. 2, 2025

(54) APPARATUS FOR DISTRIBUTING FEED WITH A CLUSTER OF ORIFICES ON A SIDE OF THE DISTRIBUTOR

(71) Applicant: UOP LLC, Des Plaines, IL (US)

(72) Inventors: Lev Davydov, Northbrook, IL (US); Zhihao Fei, Naperville, IL (US); Robert Mehlberg, Wheaton, IL (US); Mohammad-Reza Mostofi-Ashtiani, Naperville, IL (US); Sathit Kulprathipanja, Schaumburg, IL (US); Michael S. Sandacz, Glen Ellyn, IL (US)

(73) Assignee: UOP LLC, Rosemont, IL (US)

( * ) Notice: Subject to any disclaimer, the term of this patent is extended or adjusted under 35 U.S.C. 154(b) by 0 days.

(21) Appl. No.: 17/732,171

(22) Filed: Apr. 28, 2022

(65) Prior Publication Data

US 2022/0370975 A1 Nov. 24, 2022

Related U.S. Application Data

(60) Provisional application No. 63/190,062, filed on May 18, 2021.

(51) Int. Cl.
   *B01J 8/18* (2006.01)
   *B01J 8/26* (2006.01)
   *C10G 11/18* (2006.01)

(52) U.S. Cl.
   CPC .............. *B01J 8/1827* (2013.01); *B01J 8/26* (2013.01); *C10G 11/18* (2013.01); *B01J 2208/00902* (2013.01)

(58) Field of Classification Search
   None
   See application file for complete search history.

(56) References Cited

U.S. PATENT DOCUMENTS

| | | | | |
|---|---|---|---|---|
| 2,147,273 A | * | 2/1939 | Smith, Jr. | F04F 5/463 261/116 |
| 2,574,489 A | * | 11/1951 | Lassiat | C10G 11/16 422/216 |
| 4,435,279 A | * | 3/1984 | Busch | C10G 11/18 208/111.15 |
| 4,592,803 A | * | 6/1986 | Damman | B01D 1/18 159/48.1 |

(Continued)

FOREIGN PATENT DOCUMENTS

| CN | 202265546 U | 6/2012 |
|---|---|---|
| CN | 105018131 A | 11/2015 |

OTHER PUBLICATIONS

"Search Report and Written Opinion for PCT/US2022/072373", dated Sep. 5, 2022.

*Primary Examiner* — Jennifer A Leung
(74) *Attorney, Agent, or Firm* — Paschall & Associates, LLC; James C. Paschall

(57) ABSTRACT

An apparatus comprising a feed distributor comprising a side cluster of orifices instead of or in combination with an end cluster of orifices for distributing hydrocarbon feed into a catalyst stream. A side cluster of orifices in conjunction with an end cluster of orifices on a feed distributor can distribute hydrocarbon feed into a riser over a greater cross-sectional extent enabling emission of smaller droplet sizes which provide better conversion with less coke production.

20 Claims, 8 Drawing Sheets

(56) References Cited

U.S. PATENT DOCUMENTS

| | | | |
|---|---|---|---|
| 5,423,483 A * | 6/1995 | Schwade | B08B 5/02 |
| | | | 165/95 |
| 5,474,235 A * | 12/1995 | Cole | B05B 7/0892 |
| | | | 239/431 |
| 6,322,003 B1 * | 11/2001 | Haruch | B05B 7/0846 |
| | | | 239/296 |
| 6,627,161 B1 | 9/2003 | Radcliffe | |
| 7,601,304 B1 | 10/2009 | Palmas et al. | |
| 9,238,209 B2 | 1/2016 | Couch et al. | |
| 2006/0144758 A1 * | 7/2006 | Swan, III | B01J 8/1872 |
| | | | 422/139 |
| 2008/0081006 A1 | 4/2008 | Myers | |
| 2008/0191056 A1 * | 8/2008 | deLesdernier | B05B 7/0892 |
| | | | 239/1 |
| 2018/0345267 A1 | 12/2018 | Khan et al. | |

* cited by examiner

APPARATUS FOR DISTRIBUTING FEED WITH A CLUSTER OF ORIFICES ON A SIDE OF THE DISTRIBUTOR

CROSS-REFERENCE TO RELATED APPLICATIONS

This application claims priority from U.S. Provisional Application No. 63/190,062, filed May 18, 2021, which is incorporated herein in its entirety.

FIELD

The field relates to distributing feed to a stream of catalyst, particularly in a riser reactor.

BACKGROUND

Fluid catalytic cracking (FCC) is a catalytic conversion process for cracking heavy hydrocarbons into lighter hydrocarbons by bringing the heavy hydrocarbons into contact with a catalyst composed of finely divided particulate material in a fluidized reaction zone. Most FCC units use zeolite-containing catalyst having high activity and selectivity. As the cracking reaction proceeds, substantial amounts of highly carbonaceous material, referred to as coke, are deposited on the catalyst, forming spent catalyst. High temperature regeneration burns the coke from the spent catalyst. The regenerated catalyst may be cooled before being returned to the reaction zone. Spent catalyst is continually removed from the reaction zone and replaced by essentially coke-free catalyst from the regeneration zone.

The basic components of the FCC process include a riser, a reactor vessel, a catalyst stripper, and a regenerator. In the riser, a feed distributor injects the hydrocarbon feed which contacts the catalyst and is cracked into a product stream containing lighter hydrocarbons. An inert lift gas such as steam may be used to accelerate catalyst in a lower section of the riser below or during introduction of the feed. The lift velocity refers to the velocity of the inert gas and the lifted catalyst just before feed distribution into the lift gas. Catalyst and hydrocarbon feed are transported upwardly in the riser by the expansion of the gases that result from the vaporization of the hydrocarbons and other lift and dispersion media as well as molar expansion of cracked products upon contact with the hot catalyst. Coke accumulates on the catalyst particles as a result of the cracking reaction, and the catalyst is then referred to as "spent catalyst." The reactor vessel disengages spent catalyst from product vapors. The catalyst stripper removes adsorbed hydrocarbons from the surface of the catalyst. The regenerator burns the coke from the catalyst and recycles the regenerated catalyst into the riser.

A problem encountered during the FCC process is distributing the feed in the riser so that it can adequately mix with the catalyst. Adequate mixing is usually necessary for efficient conversion of the feed. Hydrocarbon feed distributors spray dispersion steam and hydrocarbon feed into the riser at a tip exit velocity with a horizontal component across the riser. It is desired to distribute feed to all points in a cross-section of the riser to ensure that all of the up-flowing stream of catalyst is contacted with the hydrocarbon feed stream. Feed distribution to particular areas of the cross-section of the riser disposed between the feed distributors can be difficult to achieve. Feed injection toward the center of the riser in combination with limited spray angle and number of feed distributors may inhibit distributing feed to the catalyst flowing close to the wall. Moreover, a relationship between injected feed velocity, drop size and momentum limits the horizontal travel of the injected hydrocarbon feed against the lift gas and catalyst accelerating vertically, upwardly in the riser. Larger riser diameters may exacerbate this problem because of the difficulty in distributing the feedstock to the center of the riser.

Efforts have been made to extend tips of feed distributors radially further into the riser to ensure sufficient feed penetrates the upwardly flowing column of catalyst and is distributed to the core of the riser. However, feed distributors are needed that can distribute feed across a greater cross section of the riser reactor.

BRIEF SUMMARY

An apparatus is provided with a cluster of orifices positioned on the side of a feed distributor. An apparatus is also provided with multiple clusters of orifices at different positions on the feed distributor. The feed distributor may distribute feed from multiple, different positions on the feed distributor. Different distributors may be provided at different levels to distribute feed over a greater cross section of the riser.

Additional details and embodiments of the invention will become apparent from the following detailed description of the invention.

DEFINITIONS

Figure 1:
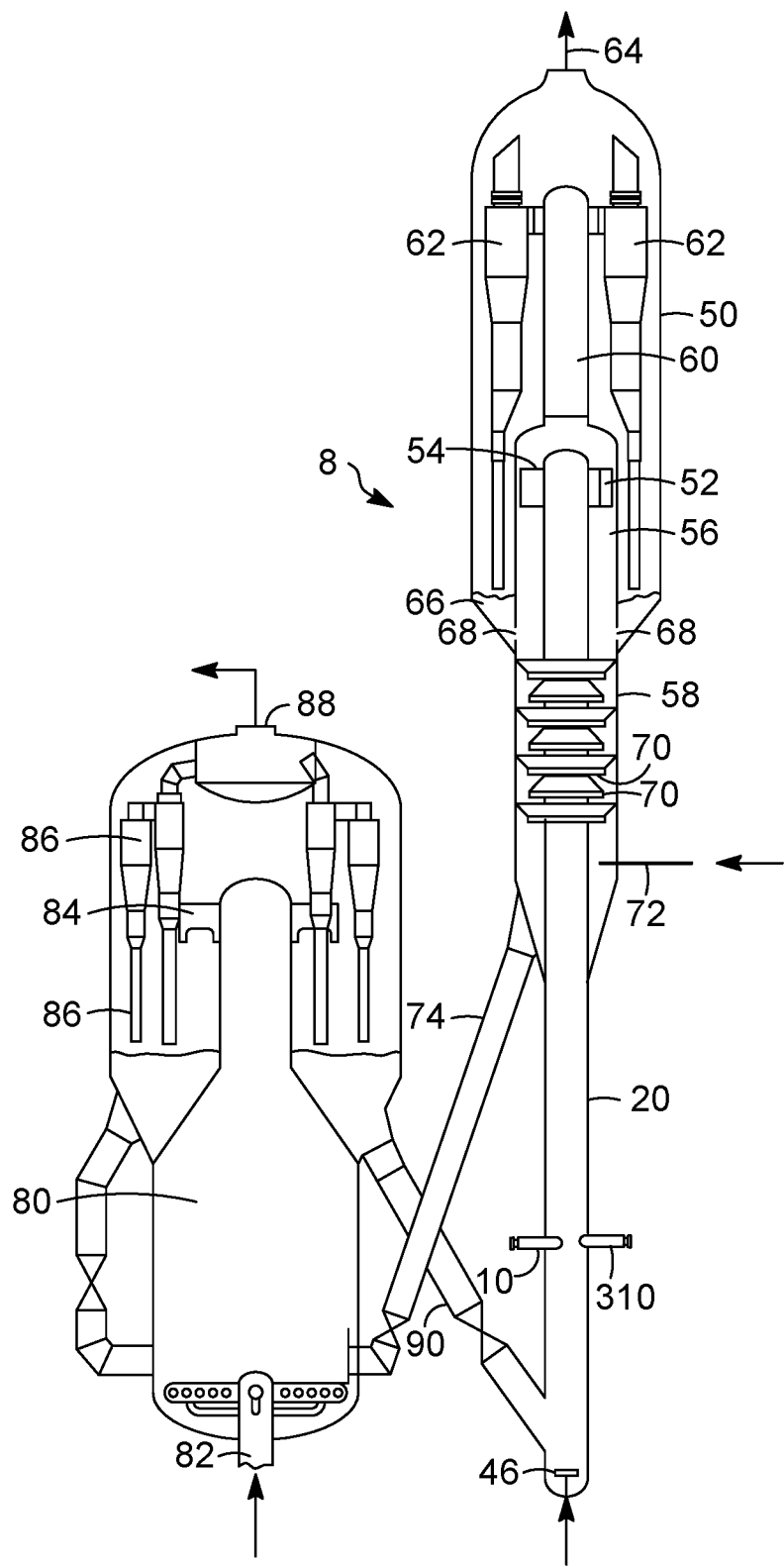
FIG. 1 is a schematic view of a conversion unit of the present disclosure.

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

As used herein, the term "T5" or "M5" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, "vacuum gas oil" means a hydrocarbon material having an IBP of at least about 232° C. (450° F.), a T5 of between about 288° C. (550° F.) and about 392° C. (700° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric as determined by any standard gas chromatographic simulated distillation method such as ASTM D2887, D6352 or D7169, all of which are used by the petroleum industry.

As used herein, "atmospheric residue" means a hydrocarbon material having an IBP of at least about 232° C. (450° F.), a T5 of between about 288° C. (550° F.) and about 392° C. (700° F.), typically no more than about 343° C. (650° F.), and a T95 between about 510° C. (950° F.) and about 700° C. (1292° F.) obtained from the bottoms of an atmospheric crude distillation column.

As used herein, "vacuum residue" means the hydrocarbon material boiling with an IBP of at least about 500° C. (932° F.).

As used herein, the term "predominant" or "predominate" means greater than 50%, suitably greater than 75% and preferably greater than 90%.

DETAILED DESCRIPTION

One feed injection philosophy for FCC units is to design the distributor to provide a certain proportion of larger droplets in the feed spray to facilitate feed penetration into the core of the FCC riser. Computational Fluid Dynamic analysis of an FCC riser has shown that, while larger droplets penetrate further in the riser, they take considerably longer to evaporate and react over catalyst. A refiner can increase the feed temperature to reduce feed viscosity and increase steam rate through the nozzle to drive up shear rates, both adjustments leading to smaller droplet size and reduced delta coke. However, increased feed pre-heating leads to lower catalyst-to-oil ratio (C/O) and possibly conversion loss, while higher steam rates "displace" feed that otherwise could have been processed in the unit. Consequently, it would be preferable to physically deliver droplets to the core to ensure the hydrocarbon feed is completely distributed to the riser cross-section.

For larger FCC risers greater than 1.6 m (5 ft) in diameter, extended feed distributors physically extended into the core of the riser may be used to spray feed into the core of the riser. However, the size distribution of the droplets coming off the extended feed distributors are essentially the same as that of the unextended distributors. However, the extended distributors did not adequately distribute feed to the outer regions of the riser near the wall.

A distributor is provided that delivers droplets across a greater cross-section of the riser to provide an even distribution of C/O across the cross-section. A single feed distributor may distribute feed nearer to the wall from a side cluster of orifices and/or distribute feed from different positions on the distributor and into the riser.

Feed droplets emanating from the orifices do not have to be larger than typical to assure uniformity of C/O distribution across the cross-section of the riser by feed penetration into the core. Because the feed distribution is distributed along the feed distributor instead of just being concentrated at the end of the distributor, the disturbance in the catalyst flow dynamic is also reduced to provide more uniform mixing between catalyst and feed.

This disclosure relates generally to an improved process and apparatus of an improved feed distributor arrangement and may be useful for FCC or other fluidized catalytic operation to improve feedstock conversion through greater feed dispersal, especially in larger units such as with inner diameters greater than 1.3 m (4 ft), suitably greater than 1.6 m (5 ft) and preferably greater than 2 m (6 ft). The process and apparatus of this disclosure may be used in the design of new FCC units or to modify the operation of existing FCC units.

As shown in FIG. 1, an FCC unit 8 may be used in the disclosed process. Hydrocarbon feed or feedstock comprising vacuum gas oil or atmospheric residue or vacuum residue may be distributed by distributors 10, 310 into a reactor which may be a riser 20 where it contacts lift gas and a stream of catalyst. The lift gas may include inert gas such as steam distributed by lift gas distributor 46. In general, feedstock may be cracked in the reactor 20 in the presence of catalyst to form a cracked stream. Distributors 10, 12 may be located at different radial positions in the riser 20 to improve feedstock distribution in the riser 20 and mixing with catalyst.

Figure 2:
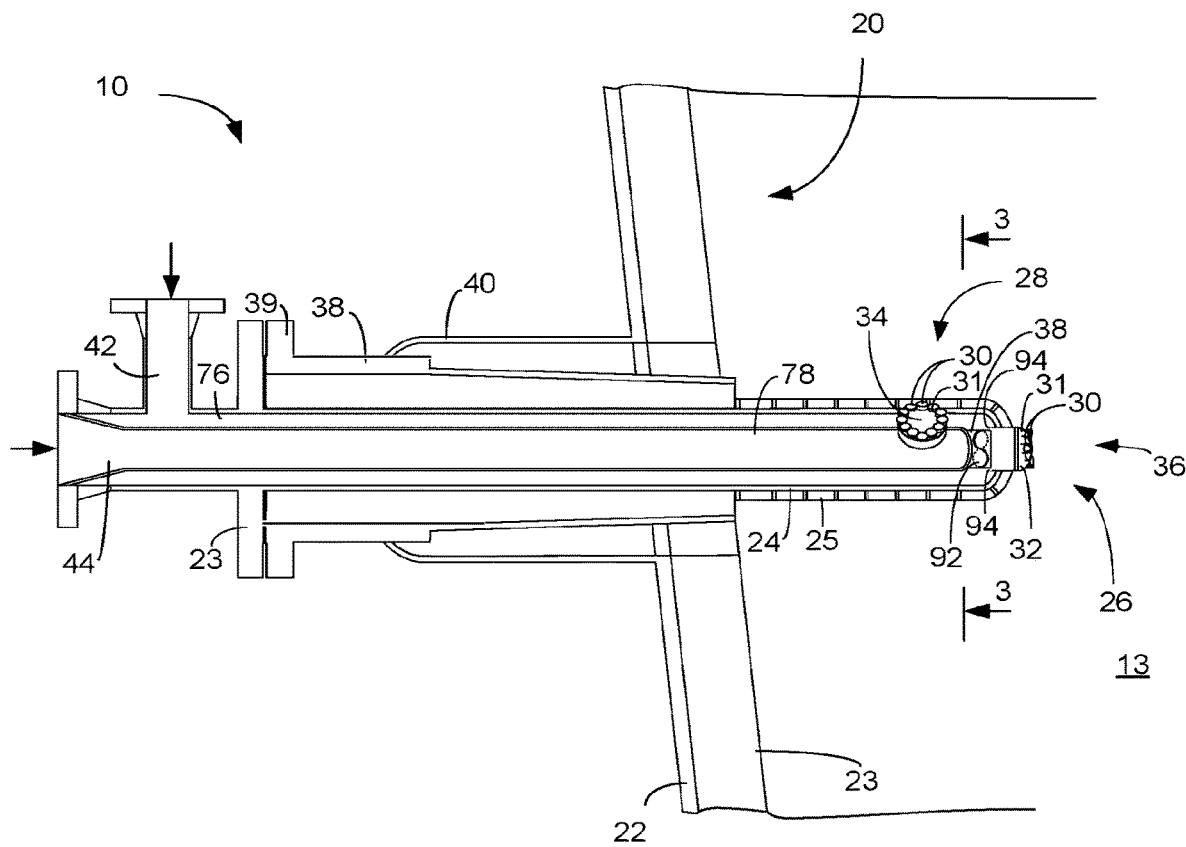
FIG. 2 is an enlarged, partial schematic view of FIG. 1.

The distributor 10 is shown in more detail in FIG. 2. The distributor 10 has a horizontal configuration, but an upwardly angled configuration may also be suitable. The distributor 10 is illustrated protruding through a wall 22 of the riser 20 which may be made of steel and comprising an inner coating of a refractory lining 23. The feed distributor 10 may comprise an outer distributor barrel 24 which may be made of steel and coated with a refractory lining 25. The feed distributor 10 may comprise a cluster of orifices 30 for spraying hydrocarbon feed into the reactor 20. An end cluster 26 of orifices 30 may be located at an inner position in the riser. The feed distributor 10 may alternatively or in conjunction with the end cluster of orifices comprise a side cluster 28 of orifices 30 located at an outer position relative to the end cluster of orifices. The side cluster 28 of orifices 30 is located at an outer position spaced apart from the inner position at which the end cluster 26 of orifices is located on the feed distributor 10. As shown in FIG. 2, the end cluster 26 of orifices 30 and the side cluster 28 of orifices are located at different longitudinal positions on the feed distributor 10. The side cluster of orifices may be located on a lateral side of the feed distributor.

The orifices 30 are openings in the distributor 10 that emit hydrocarbon feed into the riser 20. The orifices 30 may be provided by small tubes 31 which impart direction and pattern to the spray of hydrocarbon feed from the respective orifice. Additionally, the orifice 30 itself may be configured to impart a desired trajectory to the spray of hydrocarbon feed emitted therefrom. The orifices 30 in a particular cluster 26, 28 may be configured together to cooperatively spray feed in a desired pattern, such as in a fan pattern. The orifices 30 may be round, such as circular or ovular, or may comprise slots.

In an embodiment, the end cluster of orifices 26 may located on an end tip 32. In a further embodiment, the side cluster of orifices 28 may be located on a side tip 34. The tips 32, 34 and the tubes 31 may be made of steel, or they may be made from a ceramic material to resist erosion. The tips 32, 34 may be removable from the distributor 10 for replacement with a new tip. The tips 32, 34 may extend from the distributor barrel 24.

The end cluster 26 of orifices 30 may be located on an inner end 36 of the distributor 10. The inner end 36 of the distributor 10 may protrude radially into a core 13 of the riser, so as to distribute droplets of hydrocarbon feed into an upwardly flowing column of catalyst and lift gas without necessitating large droplet size and momentum typically required to penetrate the column of catalyst and gas from outside the column. An end conduit 38 may transport hydrocarbon feed from the distributor 10 to the end tip 32 through the end cluster 26 of orifices into the riser 20.

In one embodiment, a riser 20 may include a nozzle 35 disposed within a riser sleeve 40. The nozzle 35 has a nozzle flange 39 that engages a barrel flange 23 of the distributor barrel 24 with bolts. The distributor barrel 24 receives an inert dispersion media stream such as steam from a dispersion media supply inlet 42 in downstream communication with a dispersion media supply. The distributor barrel receives a hydrocarbon feed stream through a hydrocarbon feed supply inlet 44 in downstream communication with a hydrocarbon feed supply and perhaps a feed preheater (not shown). The dispersion media travels in an annulus 76 between an internal oil pipe 78 and the distributor barrel 24. The end cluster 26 of orifices 30 may be in downstream communication with the hydrocarbon feed supply inlet 44 and the media supply inlet 42. The side cluster 28 of orifices 30 may also be in downstream communication with the hydrocarbon feed supply inlet 44 and the media supply inlet 42.

The end conduit 38 extends from the internal oil pipe 78 to the end tip 32 and transports a mixture of oil from the internal oil pipe 78 to the end cluster 26 of orifices 30 on the end tip 32. The hydrocarbon feed stream may pass from the internal oil pipe 78 over vanes 92 that may be in the end conduit 38 causing the oil to swirl before combining with the dispersion media entering from the annulus 76 through a port 94 in the tip 32 and exiting through the orifices 30 in the end cluster 26 on the end tips 32. Several ports 94 may be utilized and located at a variety of locations.

Figure 3:
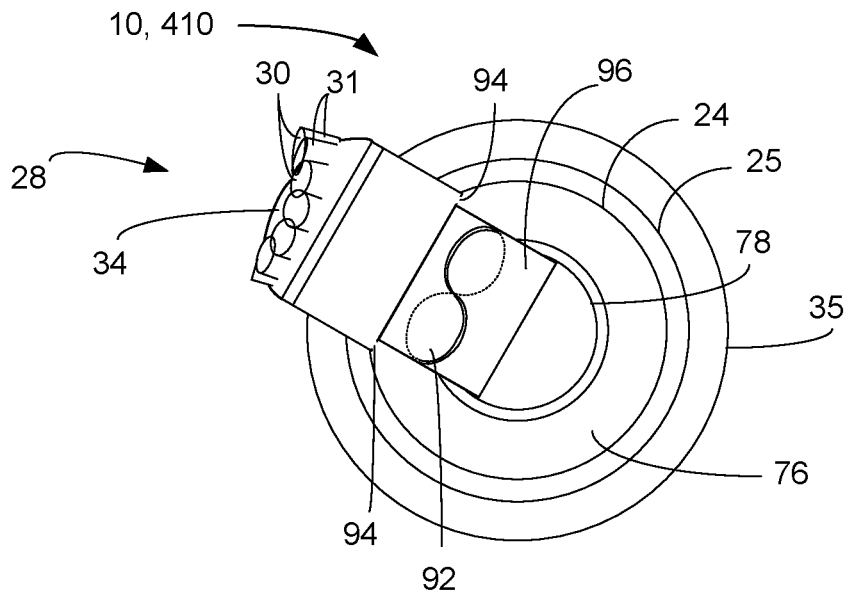
FIG. 3 a sectional view of FIGS. 2 and 7 taken at segment 3-3.
Figure 7:
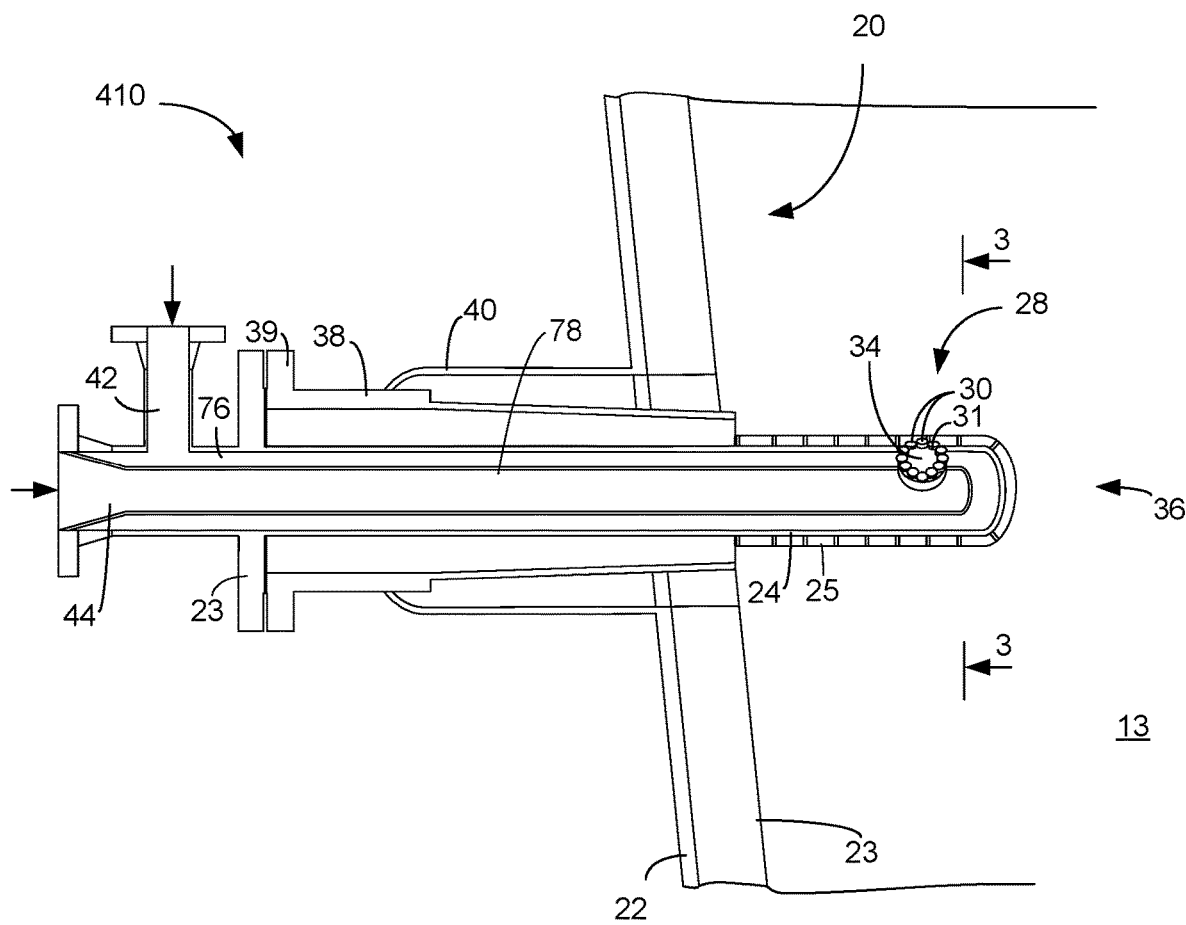
FIG. 7 is an enlarged, partial schematic view of an alternative embodiment of FIG. 2.

FIG. 3 illustrates a cross sectional view of the feed distributor 10 taken at segment 3-3 in FIGS. 2 and 7. A side conduit 96 extends from the internal oil pipe 78 to the side tip 34. The side conduit 96 may extend perpendicularly from the feed distributor 10 and particularly the internal oil pipe 78. The side cluster 28 of orifices 30 may be located on the side tip 34. The hydrocarbon feed stream may pass from the internal oil pipe 78 over vanes 92 that may be in the side conduit 96 causing the oil to swirl before combining with the dispersion media entering from the annulus 76 through a port 94 in the side tip 34 and exiting through the orifices 30 from the side cluster 28 on the side tip 34. Several ports 94 may be utilized and located at a variety of locations. The side cluster 28 of orifices 30 may spray hydrocarbon feed in a direction that is transverse, and perhaps perpendicular, to the hydrocarbon sprayed from the end cluster 26 of orifices. Feed sprayed from the side cluster 28 of orifices 30 may take a tangential direction relative to the riser 20. The distributor barrel 24, its refractory lining 25 and the nozzle 38 are also visible in FIG. 3.

Figure 4:
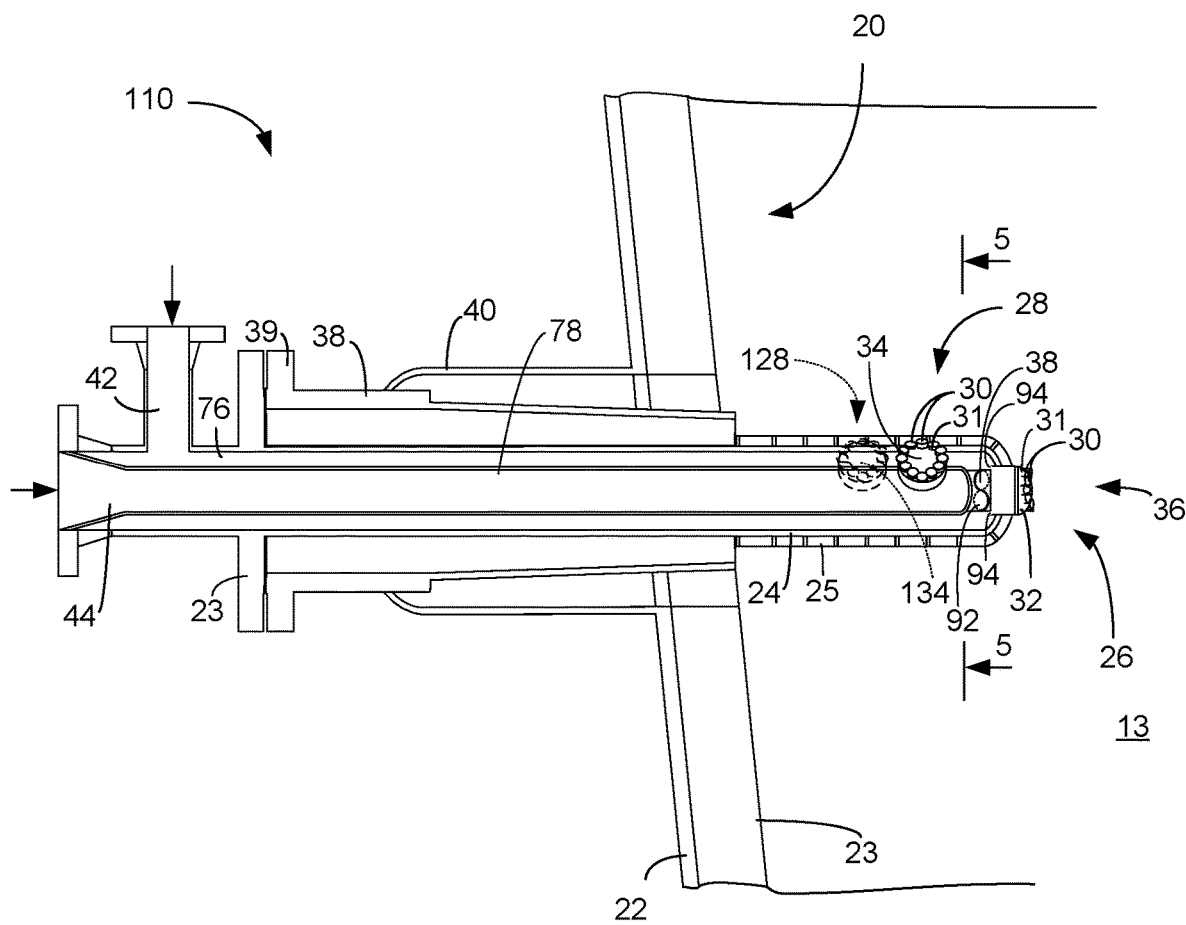
FIG. 4 is an enlarged, partial schematic view of an alternative embodiment of FIG. 2.

FIG. 4 illustrates an alternative embodiment to FIG. 2 that includes a second side cluster of orifices 128 on the second side tip 134 shown in phantom from the back side. Elements in FIG. 4 that have the same configuration as in FIG. 2 bear the same reference number. Elements in FIG. 4 that correspond to elements in FIG. 2 but have a different configuration bear the same reference numeral as in FIG. 2 are preceded with a digit "1". The first side cluster 28 of orifices 30 and the second side cluster 128 of orifices are located at longitudinally spaced apart, but adjacent positions to each other on the distributor 10.

Figure 5:
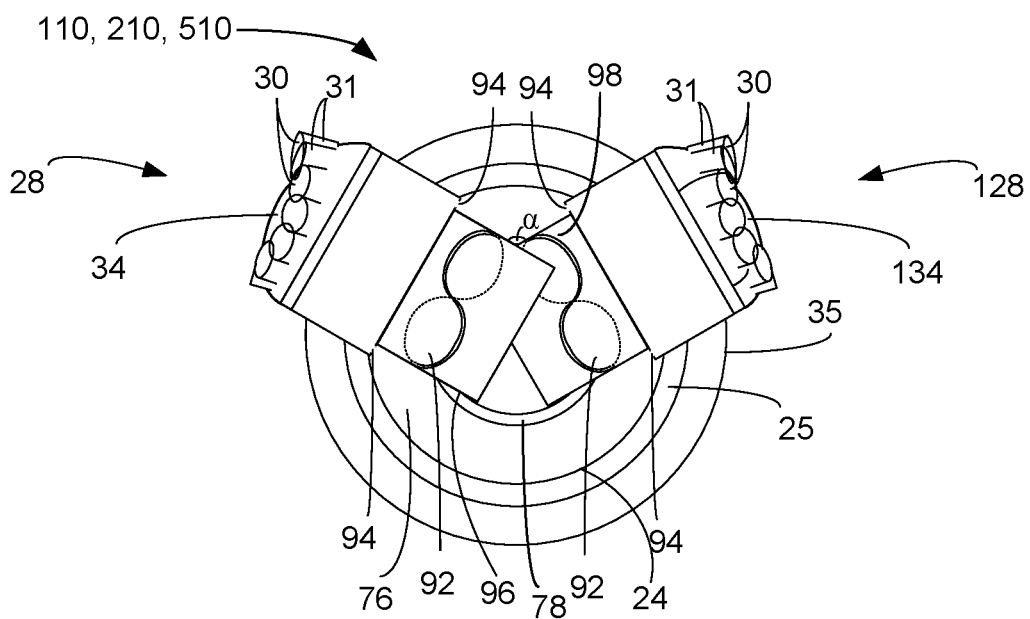
FIG. 5 a sectional view of FIGS. 4, 6 and 9 taken at segment 5-5.
Figure 9:
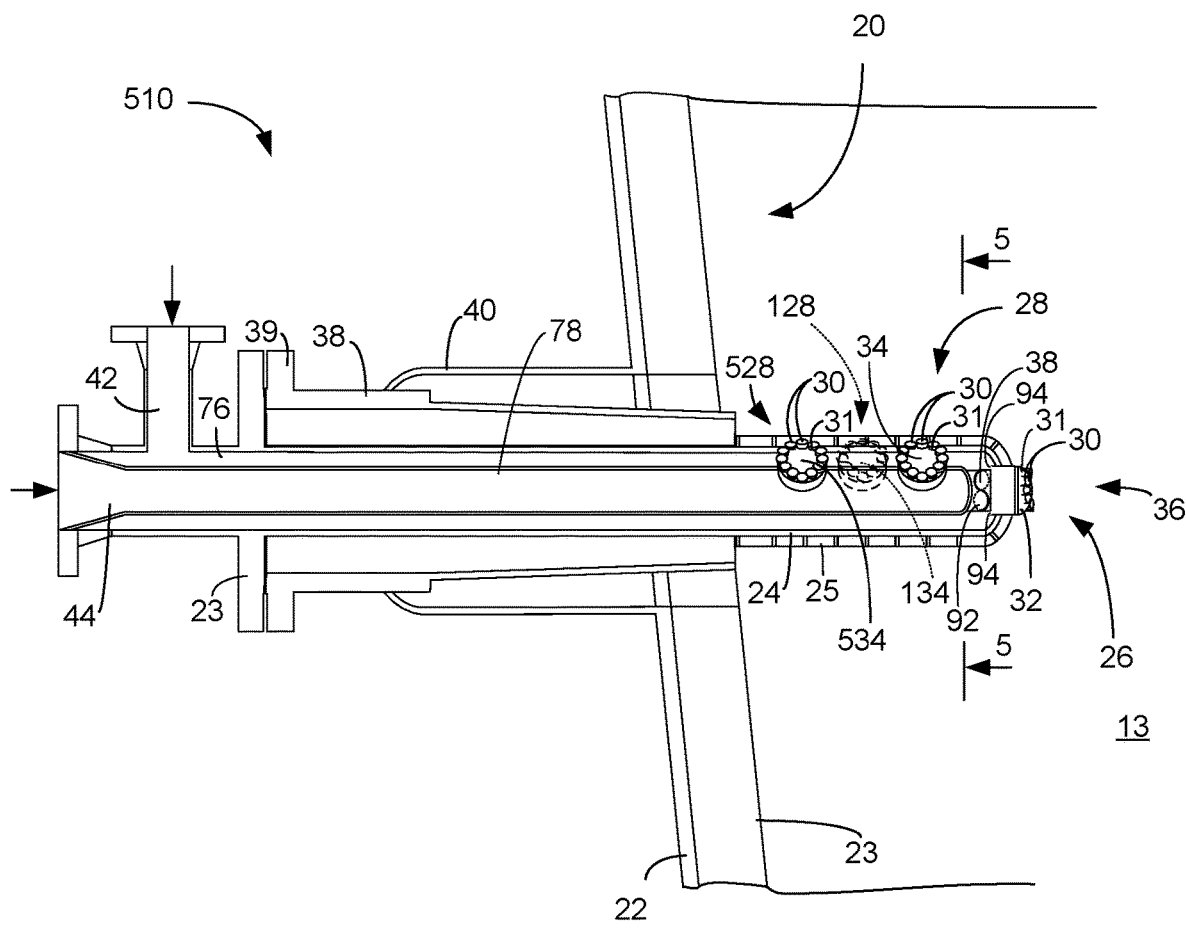
FIG. 9 is an enlarged, partial schematic view of an additional alternative embodiment of FIGS. 2 and 4.

FIG. 5 illustrates an alternative cross-sectional view of the feed distributor 110 taken at segment 5-5 in FIGS. 2, 4 and 9 of a first side cluster 28 of orifices 30 and an optional second side cluster 128 of orifices 30. The first side cluster 28 of orifices 30 and the second side cluster 128 of orifices are at different lateral positions on the feed distributor 10. The first side cluster 28 of orifices 30 may be located at a first outer position and the second side cluster 128 of orifices may be located at a second outer position on the distributor 10 that are spaced apart from each other. The first side conduit 96 may extend perpendicularly from the feed distributor 110 and particularly the internal oil pipe 78. A second side conduit 98 may extend perpendicularly from the feed distributor 110 and particularly the internal oil pipe 78. The first side cluster 28 of orifices 30 and the second side cluster 128 of orifices may be located on different radiuses, such that the second outer position is oriented angularly apart from the first outer position. The first position defines an angle with the second position.

A first side conduit 96 extends from the internal oil pipe 28 to a first side tip 34 and transports a mixture of oil and dispersion media from the internal oil pipe 78 to the first side cluster 28 of orifices 30. The first side cluster 28 of orifices 30 may be provided on a first side tip 34. The hydrocarbon feed stream may pass from the internal oil pipe 78 over vanes 92 that may be in the first side conduit 96 causing the oil to swirl before combining with the dispersion media entering from the annulus 76 through a port 94 in the first side tip 34 and exiting through the orifices 30 from the first side cluster 28 on the first side tip 34. Several ports 94 may be utilized and located at a variety of locations. The second side conduit 98 extends from the internal oil pipe 28 to a second side tip 134 and transports a mixture of oil and dispersion media from the internal oil pipe 78 to the second side cluster 128 of orifices. The second side cluster 128 of orifices 30 may be provided on a second side tip 134. The hydrocarbon feed stream may similarly pass from the internal oil pipe 78 over vanes 92 that may be in the second side conduit 98 causing the oil to swirl before combining with the dispersion media entering from the annulus 76 through a port 94 in the second side tip 134 and exiting through the orifices 30 from the second side cluster 128 on the second side tip 134. A longitudinal axis through the first side cluster 34 in the first outer position and a longitudinal axis through the second side cluster 134 in the second outer position define an angle that is less than 180° and represented by angle α between the first side conduit 96 and the second side conduit 98 which each may be parallel to the respective longitudinal axes through the side clusters 28, 128.

The first side cluster 28 of orifices 30 of orifices may spray hydrocarbon feed in a direction that is transverse, and perhaps perpendicular, to the end cluster 26 of orifices. The second side cluster 128 of orifices may spray hydrocarbon feed in a direction that is transverse, and perhaps perpendicular, to the hydrocarbon sprayed from the end cluster 26 of orifices. Feed sprayed from the first side cluster 28 of orifices 30 and/or the second side cluster 128 of orifices may take a tangential direction relative to the riser 20. The distributor barrel 24, its refractory lining 25 and the nozzle 38 are also visible in FIG. 5.

Figure 6:
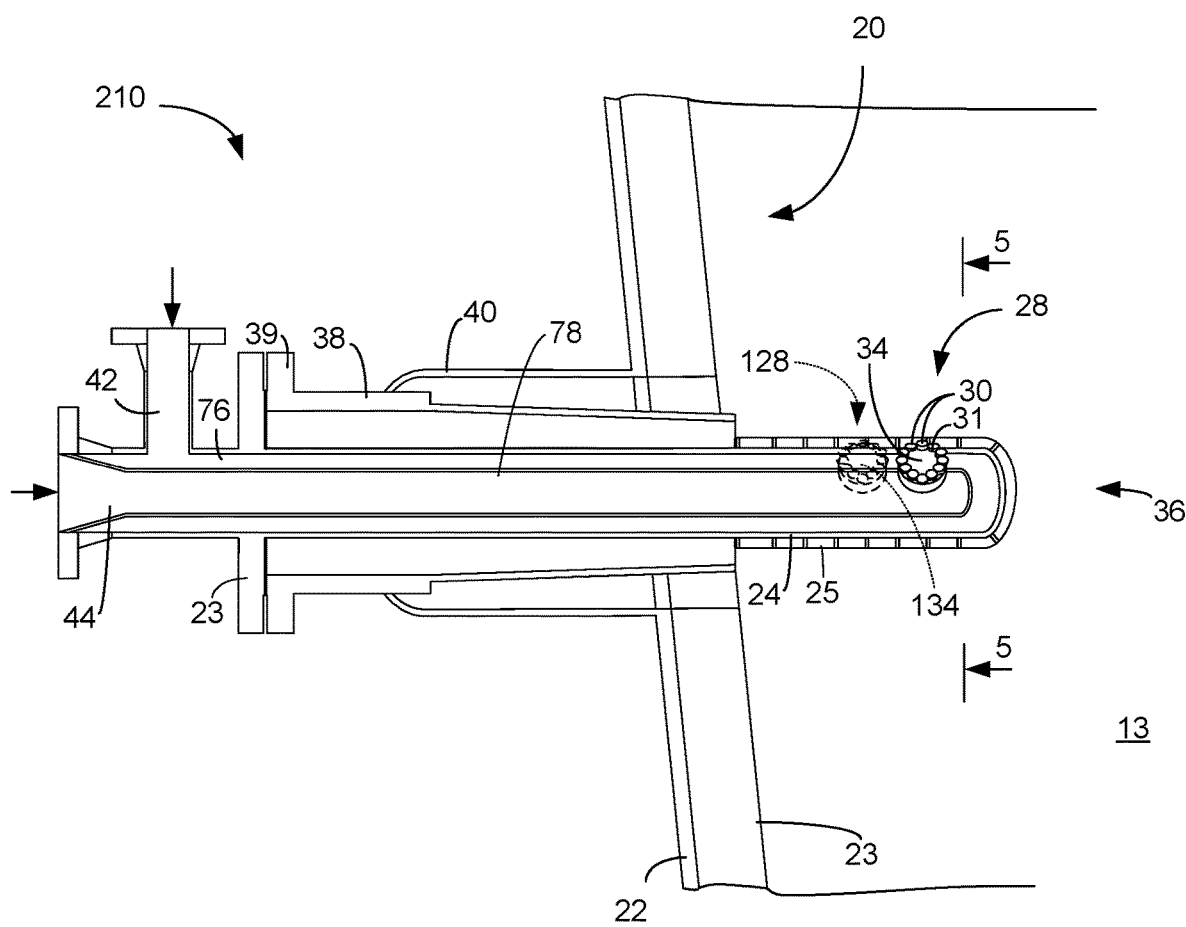
FIG. 6 is an enlarged, partial schematic view of an additional alternative embodiment of FIGS. 2 and 4.

FIG. 6 illustrates another alternative embodiment to FIGS. 2 and 4 that includes a second side cluster of orifices 128 on the second side tip 134 shown in phantom from the back side. Elements in FIG. 6 that have the same configuration as in FIGS. 2 and 4 bear the same reference number. Elements in FIG. 6 that correspond to elements in FIGS. 2 and 4 but have a different configuration bear the same reference numeral as in FIGS. 2 and 4 but are preceded with a digit "2". The first side cluster 28 of orifices 30 and the second side cluster 128 of orifices are located at longitudinally adjacent positions to each other on the distributor 210. However, the end cluster 26 of orifices 30 on the tip 32 at the inner end 36 and the end conduit 38 are omitted. Only side clusters of orifices 28, 128 are provided on the distributor 210. FIG. 5 illustrates the sectional view of FIG. 6 taken at segment 5-5.

FIG. 7 illustrates another alternative embodiment to FIG. 2 that includes only a single side cluster of orifices 28 on a side tip 34. Elements in FIG. 7 that have the same configuration as in FIG. 2 bear the same reference number. Elements in FIG. 7 that correspond to elements in FIG. 2 but have a different configuration bear the same reference numeral as in FIG. 2 but are preceded with a digit "4". The side cluster 28 of orifices 30 is located on a lateral side on the distributor 410. However, the end cluster 26 of orifices 30 on the tip 32 at the inner end 36 and the end conduit 38 are omitted. Only a single side cluster of orifices 28, 128 is provided on the distributor 410. FIG. 5 illustrates the sectional view of FIG. 7 taken at segment 5-5.

Figure 8:
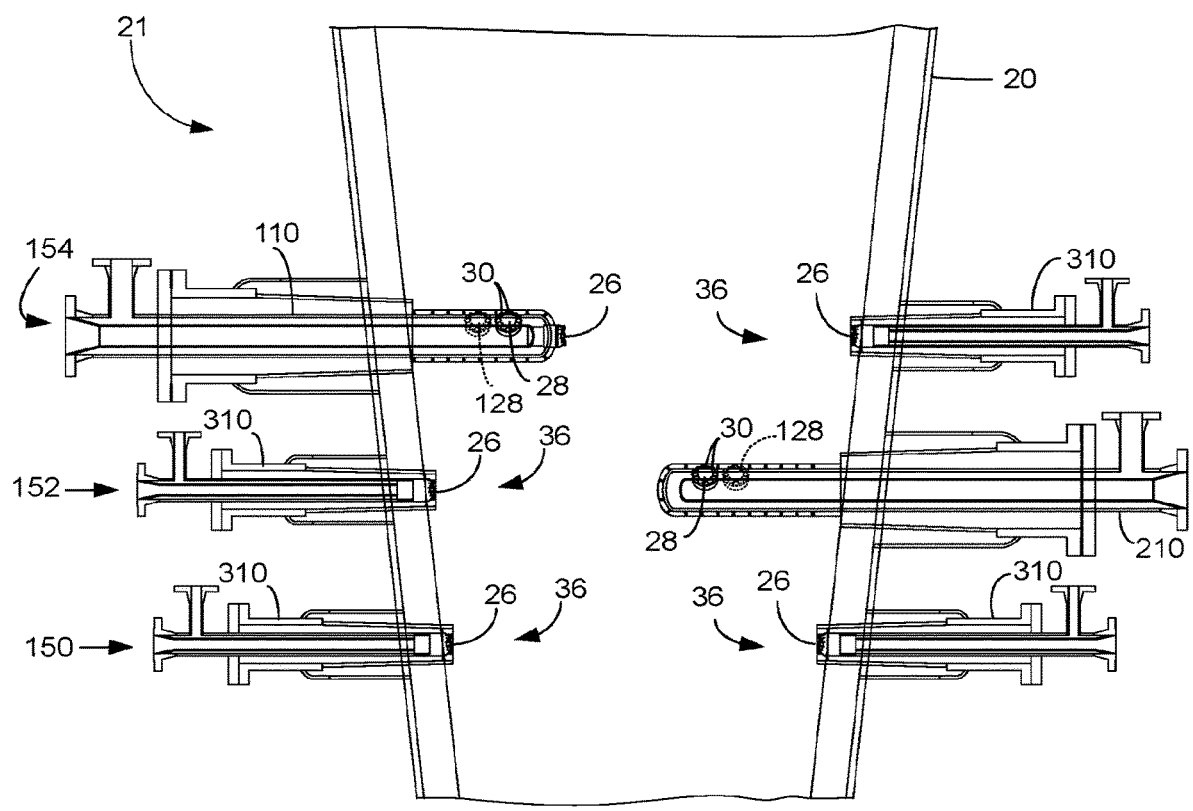
FIG. 8 is an enlarged, partial schematic view of an alternative embodiment to FIG. 1.

FIG. 8 depicts a swaged section 21 of the riser 20 with levels 150-154 of feed distributors. A lower level 152 of feed distributors including a feed distributor 210 as depicted in FIG. 5 comprising a first number, in an embodiment, two, of clusters 28, 128 of orifices 30 for distributing feed to the riser 20. In an embodiment, the feed distributor 210 comprises two side clusters 28, 128 of orifices 30. A higher level 154 of feed distributors 110 includes a feed distributor 110 as depicted in FIG. 4 comprising a second number, in an embodiment, three, of clusters 26, 28 and 128 of orifices 30 for distributing feed to the riser 20. The second number of clusters of orifices 30 on the distributor 110 in the higher level 154 is greater than the first number of clusters of orifices on the distributor 210. Moreover, the higher level 154 has a greater height than the lower level 152 in the riser 20. In an embodiment, each distributor 110, 210 with multiple clusters of orifices may be diametrically opposed to a conventional distributor 310 which may have only a single end cluster of 26 orifices at the end of the distributor. In sum, the higher level 154 of feed distributors should have at least one distributor 110 with a greater number of clusters of orifices than the distributor 210 with the greatest number of clusters of orifices on the lower level 152.

The higher level 154 may comprise three distributors 110 with multiple clusters 26, 28, 128 of orifices 30 and three conventional distributors 310 with a single end cluster 26 of orifices. The lower level 152 may comprise three distributors 210 with multiple side clusters 28, 128 of orifices 30 and three conventional distributors 310 with a single end cluster 26 of orifices.

In an embodiment, a base level 150 of peripheral feed distributors 310 may all be provided with only an end cluster 26 of orifices 30. In an embodiment 6 to 12 peripheral feed distributors 310 with end clusters 26 may be provided in the base level 150. The distributors 110, 210, 310 on each level 150-154 should be evenly radially spaced apart on the riser.

In the embodiment of FIG. 8, the lowest level 150 has only peripheral distributors 310 with end clusters 26 of orifices to spray droplets radially to "condition" the core-annular flow of catalyst in the lower end of the swaged section 21 of the riser. The lower level 152 has alternating peripheral distributors 310 and distributors 210 with two side clusters 28, 128 of orifices 30 protruding horizontally and radially into the riser. The higher level 154 has alternating peripheral distributors 310 and distributors 110 with two side clusters 28, 128 and an end cluster 26 protruding horizontally and radially into the riser 20. With this arrangement, it is possible to achieve over 90% cross-sectional coverage by smaller droplets while blocking only 35% of the cross-sectional area over all three levels 150-154.

FIG. 9 illustrates an alternative embodiment to FIGS. 2 and 4 that includes a third side cluster of orifices 528 on a third side tip 534. Elements in FIG. 9 that have the same configuration as in FIGS. 2 and 4 bear the same reference number. Elements in FIG. 9 that correspond to elements in FIGS. 2 and 4 but have a different configuration bear the same reference numeral as in FIGS. 2 and 4 but are preceded with a digit "5". The first side cluster 28 of orifices 30, the second side cluster 128 of orifices and the third side cluster 528 of orifices are located at longitudinally spaced apart, but adjacent outer positions to each other on the distributor 510. The third side cluster 528 of orifices 30 and the first side cluster 28 of orifices may be on the same lateral side of the distributor 510 and may have the same or different orientation or radial position on the distributor. The first side cluster 28 of orifices 30 and the third side cluster 528 of orifices preferably may share the same radial position although longitudinally spaced apart. The first outer position of the first side cluster 28 of orifices and third outer position of the third side cluster of orifices 528 are preferably oriented angularly apart from the second outer position of the second side cluster 128 of orifices.

It is envisioned that additional side clusters of orifices may be provided on the same side of the distributor 510 as the second side cluster 128 of orifices and may be at the same or different orientation or radial position as the second side cluster of orifices. The distributor 510 may also include an end cluster 26 of orifices 30 on an end tip 32. FIG. 5 illustrates the sectional view of FIG. 9 taken at segment 5-5.

Turning back to FIG. 1, the injected feed mixes with a fluidized bed of catalyst and moves up the riser 20 and enters the reactor 50. In the reactor 50, the blended catalyst and reacted feed vapors are then discharged from the top of the riser 20 through the riser outlet 52 and separated into a cracked product vapor stream and a collection of catalyst particles covered with substantial quantities of coke and generally referred to as "coked catalyst." A swirl arm arrangement 54, provided at the end of the riser 20, may further enhance initial catalyst and cracked hydrocarbon separation by imparting a tangential velocity to the exiting catalyst and cracked product vapor stream mixture. The swirl arm arrangement 54 is located in an upper portion of a separation chamber 56, and a stripping zone 58 is situated in the lower portion of the separation chamber 56. Catalyst separated by the swirl arm arrangement 54 drops down into the stripping zone 58.

The cracked product vapor stream comprising cracked hydrocarbons including gasoline and some catalyst may exit the separation chamber 56 via a gas conduit 60 in communication with cyclones 62. The cyclones 62 may remove remaining catalyst particles from the product vapor stream to reduce particle concentrations to very low levels. The product vapor stream may exit the top of the reactor 50 through a product outlet 64. Catalyst separated by the cyclones 62 returns to the reactor 50 through diplegs into a dense bed 66 where catalyst will pass through chamber openings 68 and enter the stripping zone 58. The stripping zone 58 removes adsorbed and entrained hydrocarbons from the catalyst by counter-current contact with steam over the optional baffles 70. Steam may enter the stripping zone 58 through a line 72. A coked catalyst conduit 74 transfers coked catalyst to a regenerator 80.

As shown in FIG. 1, the regenerator 80 receives the coked catalyst and typically combusts the coke from the surface of the catalyst particles by contact with an oxygen-containing gas. The oxygen-containing gas enters the bottom of the regenerator 80 via a regenerator distributor 82. Flue gas passes upwardly through the regenerator 80. A primary separator, such as a tee disengager 84, initially separates catalyst from flue gas. Regenerator cyclones 86, or other means, remove entrained catalyst particles from the rising flue gas before the flue gas exits the vessel through an outlet 88. Combustion of coke from the catalyst particles raises the temperatures of the catalyst. The catalyst may pass, regulated by a control valve, through a regenerator standpipe 90 which communicates with the bottom portion of riser 20.

In the FCC process a lift gas such as steam may be passed into the riser 20 to contact and lift the catalyst in the in the riser 20 to the feed point. Regenerated catalyst from the regenerator standpipe 90 will usually have a temperature in a range from about 649° and about 760° C. (1200° to 1400° F.). The dry air rate to the regenerator may be between about 3.6 (8 lbs/lb coke) and about 6.3 kg/kg coke (14 lbs/lb coke). The hydrogen in coke may be between about 4 and about 8 wt-%, and the sulfur in coke may be between about 0.6 and about 3.0 wt-%. Catalyst coolers on the regenerator may be used. Additionally, the regenerator may be operated under partial carbon monoxide combustion conditions. Moreover, water or light cycle oil may be added to the bottom of the riser to maintain the appropriate temperature range in FCC unit. Conversion is defined by conversion to gasoline and lighter products with 90 vol-% of the gasoline product boiling at or below 193° C. (380° F.) using ASTM D-86. The conversion may be between about 55 and about 90 vol-% as produced.

The zeolitic molecular sieves used in typical FCC gasoline mode operation have a large average pore size and are suitable for the present invention. Molecular sieves with a large pore size have pores with openings of greater than 0.7 nm in effective diameter defined by greater than 10 and typically 12 membered rings. Suitable large pore molecular sieves include synthetic zeolites such as X-type and Y-type zeolites, mordenite and Faujasite. Y-type zeolites with low rare earth content are preferred. Low rare earth content denotes less than or equal to about 1.0 wt-% rare earth oxide on the zeolitic portion of the catalyst. Catalyst additives may be added to the catalyst composition during operation.

In one embodiment, the fluidized catalyst is accelerated by lift gas from distributor 46 in a lower end of the riser 20 to reach the distributors 10, 310. We have found that the dense phase catalyst core can form in risers with an inner diameter of less than 2.2 m (6.6 ft) or 2 m (6 ft) and particularly at less than or equal to 1.7 m (5 ft) but greater than 1.3 m (4 ft) when the lift velocity is less than 4.7 m/s (14 ft/sec) or 4 m/s (12 ft/sec) and particularly no greater than 3.3 m/s (10 ft/sec) at the point of feed injection, making it difficult to distribute feed all the way to the center of the riser. At an inner diameter of at least 2.2 m (6.6 ft), we have found that the dense phase column always forms regardless of the velocity of the lift gas. The lift velocity typically does not exceed 10 m/s (30 ft/s) in an FCC unit.

The riser 20 may operate with catalyst to oil ratio of between about 4 and about 12, preferably between about 4 and about 10. Steam to the riser 20 may be between about 3 and about 15 wt-% of hydrocarbon feed, preferably between about 4 and about 12 wt-%. Before contacting the catalyst, the raw oil feed may have a temperature in a range of from about 149° C. (300° F.) to about 427° C. (800° F.), preferably between about 204° C. (400° F.) and about 288° C. (550° F.).

The riser 20 may operate in a temperature range of between about 427° C. (800° F.) and 649° C. (1200° F.) preferably between about 482° C. (900° F.) and about 593° C. (1100° F.). The pressure in the riser 20 may be between about 103 kPa (gauge) (15 psig) and about 241 kPa (gauge) (35 psig).

The feed pressure drop across the feed distributor 10 may be between about 69 kPa (gauge) (10 psig) and about 690 kPa (gauge) (100 psig), preferably between about 205 kPa (gauge) (30 psig) and about 415 kPa (gauge) (60 psig). The steam on hydrocarbon feed from the distributor may be between about 0.5 and about 7 wt-%, and preferably between about 1 and 6 wt-%.

Specific Embodiments

While the following is described in conjunction with specific embodiments, it will be understood that this description is intended to illustrate and not limit the scope of the preceding description and the appended claims.

A first embodiment of the disclosure is an apparatus for distributing hydrocarbon feed to a stream of catalyst in a reactor comprising a feed distributor comprising a barrel; a first cluster of orifices at a first position on the feed distributor; and a second cluster of orifices at a second position spaced apart from the first position on the feed distributor. An embodiment of the disclosure is one, any or all of prior embodiments in this paragraph up through the first embodiment in this paragraph wherein first cluster of orifices and the second cluster of orifices are at different longitudinal positions on the feed distributor. An embodiment of the disclosure is one, any or all of prior embodiments in this paragraph up through the first embodiment in this paragraph wherein the first cluster of orifices and the second cluster of orifices are at different lateral positions on the feed distributor. An embodiment of the disclosure is one, any or all of prior embodiments in this paragraph up through the first embodiment in this paragraph further comprising a tip that provides the first cluster of orifices. An embodiment of the disclosure is one, any or all of prior embodiments in this paragraph up through the first embodiment in this paragraph further comprising an end cluster of orifices on an inner end of the feed distributor. An embodiment of the disclosure is one, any or all of prior embodiments in this paragraph up through the first embodiment in this paragraph wherein the second position is oriented angularly apart from the first position. An embodiment of the disclosure is one, any or all of prior embodiments in this paragraph up through the first embodiment in this paragraph further comprising a conduit extending to an end tip providing the first cluster of orifices. An embodiment of the disclosure is one, any or all of prior embodiments in this paragraph up through the first embodiment in this paragraph further comprising a riser reactor having a wall and the feed distributor protrudes through a wall of the riser. An embodiment of the disclosure is one, any or all of prior embodiments in this paragraph up through the first embodiment in this paragraph further comprising a hydrocarbon feed supply inlet in communication with the first cluster of orifices and the second cluster of orifices. An embodiment of the disclosure is one, any or all of prior embodiments in this paragraph up through the first embodiment in this paragraph further comprising a media feed supply inlet in communication with the first cluster of orifices and the second cluster of orifices. An embodiment of the disclosure is one, any or all of prior embodiments in this paragraph up through the first embodiment in this paragraph wherein the cluster or orifices are configured to spray in a fan pattern.

A second embodiment of the disclosure is an apparatus for distributing hydrocarbon feed to a stream of catalyst in a reactor comprising a feed distributor comprising a barrel having an inner end; and a first cluster of orifices at a first position on the feed distributor spaced apart from the inner end. An embodiment of the disclosure is one, any or all of prior embodiments in this paragraph up through the second embodiment in this paragraph further comprising a second cluster of orifices at a second position oriented angularly apart from the first position on the feed distributor. An embodiment of the disclosure is one, any or all of prior embodiments in this paragraph up through the second embodiment in this paragraph wherein the first cluster of orifices and the second cluster of orifices are located at longitudinally adjacent positions. An embodiment of the disclosure is one, any or all of prior embodiments in this paragraph up through the second embodiment in this paragraph wherein the first cluster of orifices is located on a lateral side of the feed distributor. An embodiment of the disclosure is one, any or all of prior embodiments in this paragraph up through the second embodiment in this paragraph wherein the first position defines an angle with the second position. An embodiment of the disclosure is one, any or all of prior embodiments in this paragraph up through the second embodiment in this paragraph further comprising a first conduit extending from an internal oil pipe, the first conduit having a tip providing the first cluster of orifices and a second conduit extending from the internal oil pipe, the second conduit have a tip providing the second cluster of orifices.

A third embodiment of the disclosure is an apparatus for distributing feed to a reactor riser comprising a first level of feed distributors including a first feed distributor comprising a first number of clusters of orifices for distributing feed to the riser; a second level of feed distributors including a second feed distributor comprising a second number of clusters of orifices for distributing feed to the riser, the second number being greater than the first number and the second level being higher than the first level in the riser. An embodiment of the disclosure is one, any or all of prior embodiments in this paragraph up through the third embodiment in this paragraph wherein the first level of feed distributors comprises a peripheral distributor comprising a first cluster of orifices at a first position on the peripheral distributor and a second cluster of orifices at a second position rotated angularly apart from the first location on the peripheral distributor. An embodiment of the disclosure is one, any or all of prior embodiments in this paragraph up through the third embodiment in this paragraph wherein the second level of feed distributors comprises a peripheral, axial distributor comprising a first cluster of orifices at a first position on the peripheral, axial distributor, a second cluster of orifices at a second position rotated angularly apart from the first location on the peripheral, axial distributor and a cluster of orifices on an inner end of the peripheral axial distributor. An embodiment of the disclosure is one, any or all of prior embodiments in this paragraph up through the third embodiment in this paragraph further comprising a third level of feed distributors below the first level of distributors comprising a first axial distributor comprising a cluster of orifices on an inner end of the first axial distributor across from a second axial distributor comprising a cluster of orifices on an inner end of the second axial distributor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A system comprising: a reactor and an apparatus for distributing a hydrocarbon feed to a stream of catalyst in the reactor comprising, wherein, the apparatus comprises:
    a feed distributor comprising a barrel;
    a first cluster of orifices at a first position on said feed distributor;
    a second cluster of orifices at a second position spaced apart from the first position on said feed distributor; and
    a first conduit extending from an internal oil pipe, said first conduit having a tip providing said first cluster of orifices and a second conduit extending from said internal oil pipe, said second conduit have a tip providing said second cluster of orifices,
    wherein said reactor comprises a riser having a wall and said feed distributor protrudes through said wall of said riser.

2. The system of claim 1 wherein said first cluster of orifices and said second cluster of orifices are at different longitudinal positions on said feed distributor.

3. The system of claim 1 wherein said first cluster of orifices and said second cluster of orifices are at different lateral positions on said feed distributor.

4. The system of claim 1 wherein said tip of said first conduit comprises an end tip.

5. The system of claim 4 wherein said first cluster of orifices comprises an end cluster of orifices located on said end tip on an inner end of said feed distributor.

6. The system of claim 4 wherein said second position is oriented angularly apart from the first position.

7. The system of claim 4 further comprising said first conduit extending to said end tip providing said first cluster of orifices as an end cluster of orifices.

8. The system of claim 1 further comprising a hydrocarbon feed supply inlet in communication with said first cluster of orifices and said second cluster of orifices.

9. The system of claim 8 further comprising a media feed supply inlet in communication with said first cluster of orifices and said second cluster of orifices.

10. The system of claim 1 wherein said first cluster of orifices are configured to spray in a fan pattern.

11. An apparatus for distributing hydrocarbon feed to a stream of catalyst in a riser reactor comprising:
- the riser reactor;
- a catalyst inlet in said riser reactor;
- a feed distributor comprising a barrel having an inner end for distributing feed to the riser reactor;
- a first cluster of orifices located on a first side tip at a first position on said feed distributor spaced apart from the inner end; and
- a second cluster of orifices located on a second side tip at a second position spaced apart from said inner end and said first position on said feed distributor.

12. The apparatus of claim 11 further comprising said second cluster of orifices at said second position oriented angularly apart from the first position on said feed distributor.

13. The apparatus of claim 11 wherein said first cluster of orifices and said second cluster of orifices are located at longitudinally adjacent positions.

14. The apparatus of claim 11 wherein said first cluster of orifices is located on a lateral side of said feed distributor.

15. The apparatus of claim 12 wherein said first position defines an angle with the second position.

16. The apparatus of claim 12 further comprising a first conduit extending from an internal oil pipe, said first conduit having said first side tip providing said first cluster of orifices and a second conduit extending from said internal oil pipe, said second conduit having said second side tip providing said second cluster of orifices.

17. An apparatus for distributing feed to a reactor riser comprising:
- a first level of feed distributors including a first feed distributor comprising a first number of clusters of orifices for distributing feed to the riser; and
- a second level of feed distributors including a second feed distributor comprising a second number of clusters of orifices for distributing feed to the riser, the second number being greater than the first number and the second level being higher than the first level in the riser.

18. The apparatus of claim 17 wherein the first feed distributor comprises a peripheral distributor comprising a first cluster of orifices at a first position on said peripheral distributor and a second cluster of orifices at a second position rotated angularly apart from the first location on said peripheral distributor.

19. The apparatus of claim 17 wherein the second feed distributor comprises a peripheral, axial distributor comprising a first cluster of orifices at a first position on said peripheral, axial distributor, a second cluster of orifices at a second position rotated angularly apart from the first location on said peripheral, axial distributor and a cluster of orifices on an inner end of said peripheral, axial distributor.

20. The apparatus of claim 17 further comprising a third level of feed distributors below said first level of distributors comprising a first axial distributor comprising a cluster of orifices on an inner end of said first axial distributor across from a second axial distributor comprising a cluster of orifices on an inner end of said second axial distributor.

* * * * *